(12) United States Patent
Currey et al.

(10) Patent No.: US 12,001,809 B1
(45) Date of Patent: Jun. 4, 2024

(54) SELECTIVELY TUNING MACHINE TRANSLATION MODELS FOR CUSTOM MACHINE TRANSLATIONS

(71) Applicant: Amazon Technologies, Inc., Seattle, WA (US)

(72) Inventors: Anna Currey, Sunnyvale, CA (US); Dengke Liu, Jersey City, NJ (US); Aakash Upadhyay, Seattle, WA (US); Prashant Mathur, New York, NY (US); Georgiana Dinu, New York, NY (US); Eric J. Nowell, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 377 days.

(21) Appl. No.: 17/530,398

(22) Filed: Nov. 18, 2021

(51) Int. Cl.
*G06F 40/58* (2020.01)
*G06N 20/00* (2019.01)

(52) U.S. Cl.
CPC ............. *G06F 40/58* (2020.01); *G06N 20/00* (2019.01)

(58) Field of Classification Search
CPC ................. G06F 40/58; G06N 20/00
USPC ............................................................ 704/2
See application file for complete search history.

(56) References Cited

U.S. PATENT DOCUMENTS

| | | | | |
|---|---|---|---|---|
| 9,026,425 | B2 * | 5/2015 | Nikoulina | G06F 40/44 704/7 |
| 11,551,002 | B2 * | 1/2023 | Sellam | G06F 40/47 |
| 11,704,506 | B2 * | 7/2023 | Sellam | G06F 40/56 704/2 |
| 11,769,019 | B1 * | 9/2023 | Mathur | G06N 3/08 704/2 |

\* cited by examiner

*Primary Examiner* — Susan I McFadden
(74) *Attorney, Agent, or Firm* — S. Scott Foster; Kowert, Hood, Munyon, Rankin & Goetzel, P.C

(57) ABSTRACT

Machine learning translation models may be selectively tuned to provide custom machine translations. A request to translate input text from an input language to a target language may be received. A tuning data set for translating the input text to the target language may be identified and searched to select pairs of texts in the tuning data according to comparisons with the input text. A machine learning model used to translate into the target language may be tuned using only second texts in the target language in the selected pairs of texts. The tuned machine learning model may then be used to translate the input text into the target language.

20 Claims, 7 Drawing Sheets

SELECTIVELY TUNING MACHINE TRANSLATION MODELS FOR CUSTOM MACHINE TRANSLATIONS

BACKGROUND

To facilitate communication across language boundaries, machine translation algorithms and models are often used, especially in circumstances in which manual translation is impracticable. Depending on the pair of languages involved, in some cases a given set of words in one language can be translated by a machine translation model into another language in more than one way, with several technically correct translations possible. While human translators can according to context, style, and various other features, determine how to select among multiple possible translations, machine translation systems may rely upon other techniques.

Figure 1:
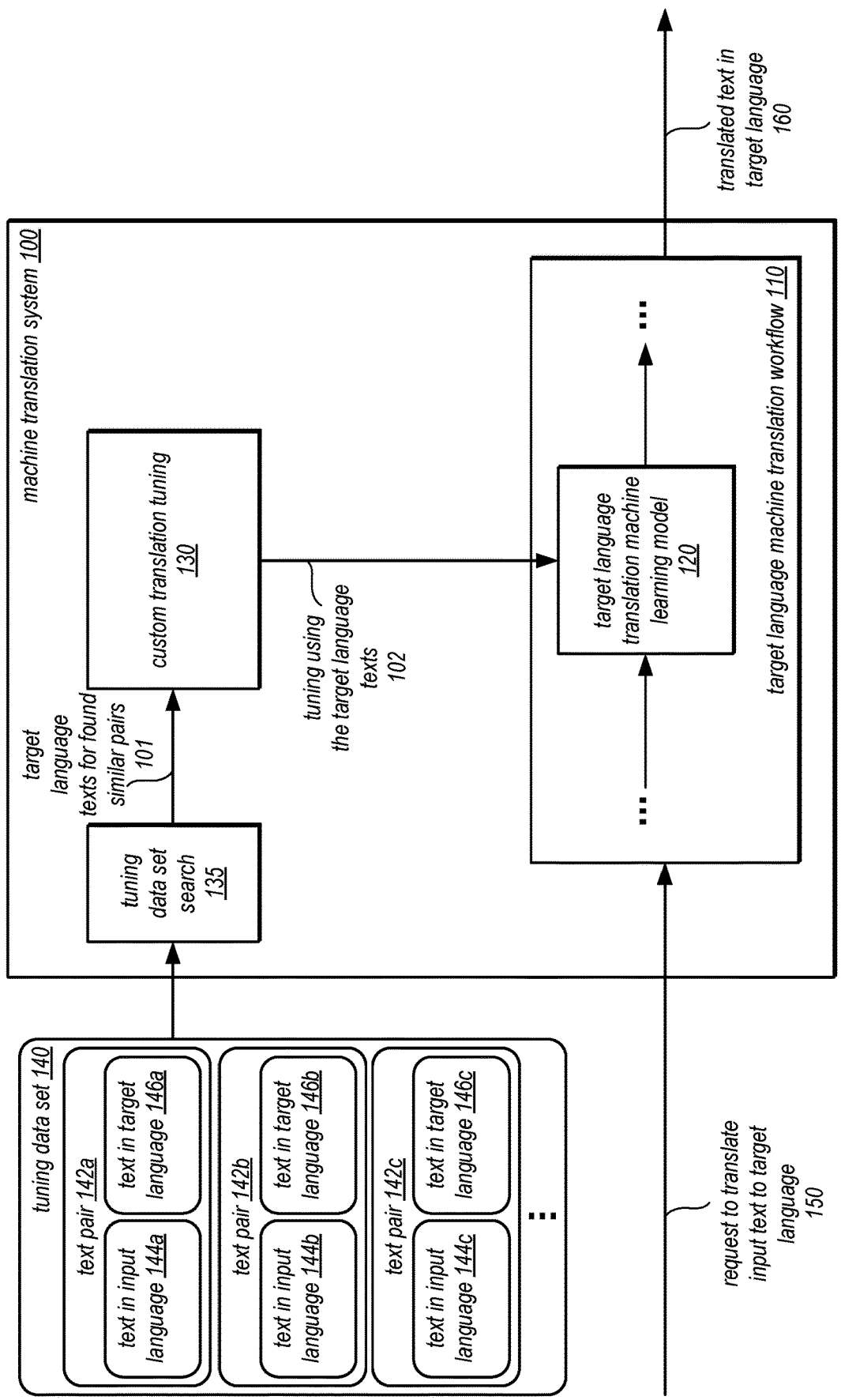
FIG. 1 illustrates a logical block diagram of selectively tuning machine translation models for custom machine translations, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for selectively tuning machine translation models for custom machine translations are described herein. Machine translation models generally translate between language pairs, e.g., pairs of (input language, output language). In order to support a large number of possible combinations of language pairs, pivot translation may be implemented in various embodiments rather than direct translation for most language pairs. In direct translation, a single system may directly translate from the input language to the output language. By contrast, pivot translation techniques cascade two systems: one that translates from the input language to a pivot language and a second that translates from the pivot language to the output language. An example of a pivot language pair may be French→German: for French→German translations, the input of French may be first translated to English (acting as a pivot language) using a French→English model and then translate that pivot language version of the input to German using an English→German model.

Customized translation adds another complication to translating between language pairs. To support customized translation, machine translation systems may allow for tuning data sets (which may sometimes be specified as parallel data (PD)) to be utilized to influence performance of machine translations. Tuning data sets may include example texts in the input language and their corresponding translations in the output language. Customized translations may be performed by using tuning data sets to dynamically customize the translations. If, for example, a desired translation is French→German, the tuning data set will most likely have direct translations from French to German. While the tuning data set could be applicable to dynamically update a French to German model, the tuning data set does not contain information that informs translation into or out of a pivot language. For instance, to update the English→German model used for pivot translation, the tuning data set would need English→German translation pairs for training. While artificial English texts could be generated for this purpose, such techniques would be prohibitively time-consuming and resource intensive (e.g., expensive). Instead, selectively tuning machine translation models may be implemented so that dynamic customization can be performed in machine translation system without generating or requiring tuning data sets to include pivot language translations.

FIG. 1 illustrates a logical block diagram of selectively tuning machine translation models for custom machine translations, according to some embodiments. Machine translation system 100 may be a standalone machine translation system, implemented as a publicly available service, like machine translation service 210 discussed below with regard to FIG. 2, or implemented as part of another system or application that utilizes machine translations. Machine translation system 100 may generate translated text in a target language 160 in response to requests 150 to translate input text from an input language to the target language.

Machine translation system 100 may implement custom translation, in various embodiments, by obtaining a tuning data set, such as tuning data set 140. Tuning data set 140 may be created, stored, and/or otherwise provided to machine translation system 100 according to the techniques discussed below with regard to FIG. 3. Tuning data set 140 may include one or more text pairs, such as text pairs 142a, 142b and 142c. Each text pair 142 may include a source text in a source language and one (or more) different translation of the source text. Thus when a request to translate input text in first language to a target language is received, as indicated at 150, each text pair may have a text in the input language, as indicated at 144a, 144b, and 144c, as well as the text in the target language, as indicated at 146a, 146b, and 146c.

Custom translation tuning 130 may be implemented by machine translation system 100 to use tuning data set 140 to dynamically tune a machine learning model that translates into the target language, such as target language translation model 120, in some embodiments, using a selected subset of text pairs 142 from tuning data set 140 (as opposed to using the entire tuning data set 140). Machine learning translation models, such as model 120, may include various types of machine learning models, such as those that utilize neural network architectures, such as Deep Neural Networks (DNN) models. Such neural network architectures may utilize encoder layers to generate a representation of a given text in a language and through one (or multiple) interior layers produce inference of a translated version of the input text in a target language, which may be generated in the target language using a decoder layer.

As discussed in detail below with regard to FIGS. 4-6, dynamic tuning may include using a tuning data set search 135 to search the text pairs 142 for similar texts in the input language 144 to the input text to translate (e.g., by performing various similarity scoring or other analysis). For those text pairs 142 with a text in the input language 144 within a similarity threshold 101, the texts 146 in the target language can be used to tune target language translation machine learning model 120. In this way, in scenarios like those utilize cascading translation machine learning models (e.g., from an input language to a pivot language and then to the target language), tuning data set 140 may still be useful to improve translation performance even though the text pairs 142 may not contain information that fully corresponds to the translation model being trained (e.g., the tuning data set 140 does not include a translated version in the pivot language).

For example, if target language machine translation workflow 110 were to use target language translation machine learning model to translate a version of the input text from a pivot language to the target language (e.g., from English to German), then tuning data set 140 can still be used to customize the translation of target language translation machine learning model 140 even though the text pairs 142 are French and German. Thus, such techniques may be used to offer customized translation performance at machine translation system 100 even when tuning data sets 140 cannot be used to update other translation models in target language machine translation workflow 110.

Please note that the previous description of selectively tuning machine translation models for custom machine translations is a logical illustration and thus is not to be construed as limiting as to the implementation of a machine translation system.

This specification continues with a general description of a provider network that implements multiple different services, including a machine translation service, which may implement selectively tuning machine translation models for custom machine translations. Then various examples of, including different components/modules, or arrangements of components/module that may be employed as part of implementing the services are discussed. A number of different methods and techniques to implement selectively tuning machine translation models for custom machine translations are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
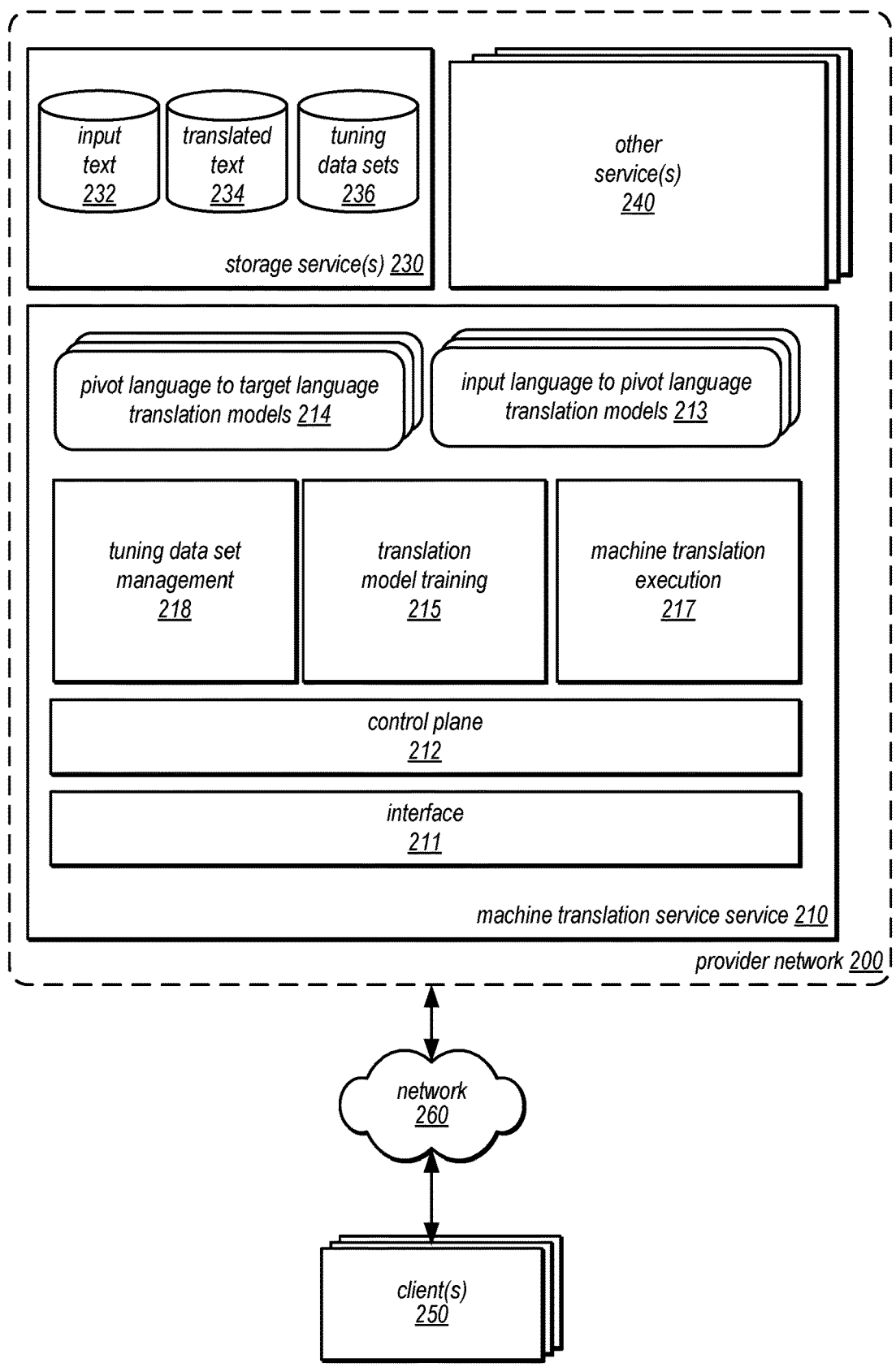
FIG. 2 illustrates an example provider network that may implement a machine translation service that selectively tunes machine translation models for custom machine translations, according to some embodiments, according to some embodiments.

FIG. 2 illustrates an example provider network that may implement a machine translation service that selectively tunes machine translation models for custom machine translations, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and services offered by the provider network 200, in one embodiment. In some embodiments, provider network 200 may implement various computing resources or services, such as machine translation service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of machine translation service 210 may be implemented by a particular node or may be distributed across several nodes. In some embodiments, a given node may implement the functionality of more than one service system component (e.g., more than one data store component).

Machine translation service 210 may implement interface 211 to allow clients (e.g., client(s) 250 or clients implemented internally within provider network 200, such as a client application hosted on another provider network service like an event driven code execution service or virtual compute service) to send requests to translate text (e.g., texts or other text strings as synchronous translation requests or batch translation of text of one (or more) documents, books, etc.). In at least some embodiments, machine translation service 210 may support various types of machine translation services, include general translation services (e.g., not using customized translation) using either direct translation models between languages or cascading translation techniques that utilize pivot languages, which may perform the various techniques discussed above with regard to FIG. 1 and below with regard to FIGS. 3-6 for input text, in some embodiments. For example, machine translation service 210 may implement interface 211 (e.g., a graphical user interface, programmatic interface that implements Application Program Interfaces (APIs) and/or a command line interface) may be implemented so that a client application can create or otherwise manage tuning data sets 236, input text 232, or to obtain translated text 234 of input text 232 to be stored in storage service(s) 230, or other storage locations or sources within provider network 200 or external to provider network 200 (e.g., on premise data storage in private networks). Interface 211 may allow a client to request custom translation using the techniques discussed above with regard to FIG. 1 and below with regard to FIGS. 3-6.

Machine translation service 210 may implement a control plane 212 to perform various control operations to implement the features of machine translation service 210. For example, control plane 212 may monitor the health and performance of requests at different components of tuning data set management 218, translation model training 215, and machine translation execution 217 (e.g., the health or performance of various nodes implementing these features of machine translation service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available node to begin work on the request.

Machine translation execution 217 may implement various machine translation features and techniques, including custom machine learning translation utilizing a cascade of machine learning translation models, such as different input language to pivot language translation models 213 and pivot language target language translation models 214. Translation model training 215 may implement the various computing resources, machine learning training frameworks, and other resources used to train new and update (including tuning for custom translation) machine learning translation models. Machine translation service 210 may implement tuning data set management 281, as discussed in detail below with regard to FIG. 3, in order to support receiving tuning data sets 236 for implementing custom machine translations.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. Data storage service(s) 230 may be accessed via programmatic interfaces (e.g., APIs) or graphical user interfaces. Input text 232, translated text 234 and tuning data sets 236 may be put and/or retrieved from data storage service(s) 230 via an interface for data storage services 230, in some embodiments.

Generally speaking, clients 250 may encompass any type of client that can submit network-based requests to provider network 200 via network 260, including requests for machine translation service 210 (e.g., a request to enhance, transmit, and/or store audio data). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other client application that may make use of machine translation service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like machine translation service 210) via network 260, in one embodiment. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
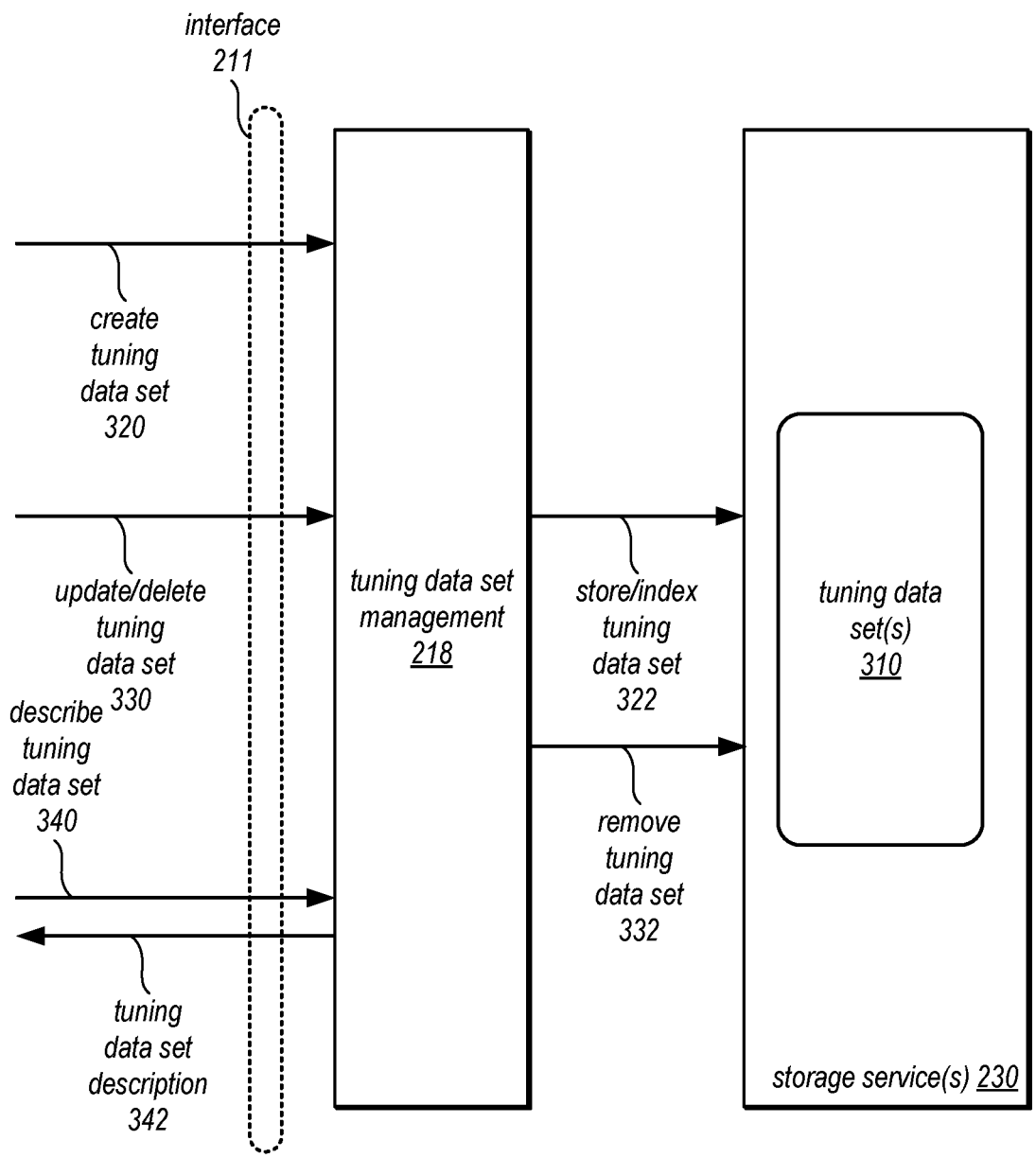
FIG. 3 illustrates a logical block diagram of different interactions to manage tuning data sets at a machine translation service, according to some embodiments.

As noted above, machine translation service 210 may implement tuning data set management 218 to allow for tuning data sets for customizing machine translations that are performed by machine translation service 210. FIG. 3 illustrates a logical block diagrams of different interactions to manage tuning data sets at a machine translation service, according to some embodiments. Interface 211 may support various requests to management tuning data sets on behalf of different users, accounts, or translation jobs, in some embodiments. For example, a create tuning data set request 320 may be submitted. The create tuning data set request 320 may identify the tuning data set, which may be one of various different formats, including, but not limited to translation memory eXchange (TMX), comma separated values (CSV) or tab-separated values (TSV). In various embodiments, request 320 may include specifying a name for the tuning data set, a location of the tuning data set (e.g., a storage location, such as in storage services 230), a file format of the tuning data set, or whether encryption is to be applied (or is applied), among other features.

Tuning data set management 218 may implement various scanners, parsers, or other components that can read the tuning data sets in the various formats and to store and index the tuning data set(s) 310, in some embodiments. For example, tuning data set management 218 may identify the different versions of a text in the different languages according to various delimiters in the tuning data set. Note that although tuning data sets are referred as including pairs of texts, these pairs may be the pairs of input language and target language in the tuning data set. The tuning data set may store other versions of the texts in other languages, in some embodiments, and thus the pairs in a tuning data set may be identified from out of a larger set of language versions (e.g., a tuning data set that includes English, Spanish, French, Chinese, and German versions of a text may be created, and the two versions that make up the input language and target language pair used when performing tuning).

As indicated at 322, tuning data set management 218 may store and/or cause to be indexed the tuning data se(s) 310 in storage services 230. In some embodiments, storage services 230 may be an indexed store that indexes stored data sets to be searchable according to various criteria, including similarity searches as discussed below. Thus, request 322 may include a request to index tuning data set 310, in some embodiments.

As indicated at 330, a request to update or delete tuning data sets 330 may also be received via interface 211. For example, a different version of the tuning data set (or additional examples to add to the tuning data set) may be received via request 330. Tuning data set management 218 may parse the updates and store them as part of tuning data set(s) 310 or as a different version of tuning data set in storage service(s) 230. For deletion requests, tuning data set management 218 may send a request to remove a tuning data set 332 from storage services 230.

In at least some embodiments, interface 211 may support requests to describe one or more tuning data sets, as indicated at 340. For example, a request to obtain various metadata about a tuning data set, may cause tuning data set management 218 to return the requested information as a description 342, including file format, name, description, time of creation/last update, user or entity that created the tuning data set, whether the tuning data set has been used, last use time, languages in the tuning data set, and so on. The request 340 for tuning data set descriptions may return a list of available tuning data sets to be used for translation, in some embodiments.

As discussed above, machine translation service 210 may implement machine translation execution 217 to perform translation tasks on behalf of various clients. As part of performing translation tasks, machine translation execution 217 may include components to implement custom translation using a tuning data set. FIG. 4 illustrates a logical block diagram of machine translation execution of a machine translation service that implements custom translation management for selectively tuning machine translation models for custom machine translations, according to some embodiments, according to some embodiments.

As indicated 402, a translation request may be received via interface 211. Different types of translation requests may be supported, such as synchronous translation requests that provide a "real-time" request experience or batch translation requests, which translate one or multiple input texts (e.g., documents) asynchronously. In various embodiments, custom translation may be specified as part of the translation request. For example, the translation request may identify a name or other identifier of the tuning data set to use for the translation. A storage location, format, or other configuration of the input text may also be specified. The input language and the target language may be specified as part of the translation request. In some embodiments, features to track or configure performance of translation may be specified, such as a translation job name and/or a location of translation job to be performed, and an output location of the translated text, and an output configuration, such as a file format. The input text may, in some embodiments, be a single text or phrase.

Machine translation execution 217 may implement custom translation management 410 to direct the performance of custom machine translation using a tuning data set. Custom translation management 410 may identify and perform a similarity search 422 on tuning data set 424, using search results 424 to tune a translation model. For example, as discussed in detail below with regard to FIG. 6, different similarity analysis techniques may be performed either by custom translation management 410 or by a data store that hosts tuning data set 420 (e.g., using fuzzy search functions, k-nearest neighbor, or other similarity techniques for comparing text strings). In some scenarios, an exact match may be found as a result of the similarity search. In such cases, custom translation management 410 may return the exact match 404 from the tuning data set as the translated version of the input text. In some embodiments, not illustrated, when search results 424 do not return any similar texts, then a general pivot to target language model may be used instead of tuned pivot to target language ML model 434 to generate translation 406.

Custom translation management 410 may then initiate a translation model training job 432 with translation model training 214 in order to train a target language model tuning with select texts. For example, a similarity threshold may be implemented in order to identify those texts in a tuning data set in the input language of the input text to determine which pairs of texts in tuning data set 420 to use to tune a general pivot language to target language machine learning model 433. As part of the training job, custom translation management 410 may configure translation model training 215 to only use target language texts from the selected pairs of texts to use for tuning. For example, in some embodiments, custom translation management 410 may freeze encoder parameters of the target language machine learning model. In another example, custom translation management 410 may modify decoder parameter training so that instead of decoding from a first text of the selected pair (in the input language) to the second text of the pair in the target language, a pre-determined text is used instead of the first text and paired with the corresponding second text in the selected pair. Custom translation management 410 may use various combinations of techniques to only use the target language texts (e.g., by both freezing the encoder parameters and using a blank sentence). In various embodiments, training hyperparameters of the training job 432 may be determined according to the similarity of the selected pairs with the input text. Translation model training 215 may then perform the training job to produce tuned pivot to target language ML model 434.

Custom translation management 410 may then execute or direct performance of a custom translation workflow 440 for translation request 402. For example, custom translation may obtain general input language to pivot language ML model 431 to include in custom translation workflow 440 that takes the input text and translate the input text into the pivot language version of the input text. Then the pivot language version of the input text is translated into the target language using the tuned pivot to target language ML model 434. Custom translation workflow 440 may thus be used to produce translation 406 of the input text for translation request 402. Translation 406 may be stored in a specified storage location, returned via an interface, and/or stored/transmitted in a specified format (e.g., specified in translation request 402).

Figure 4:
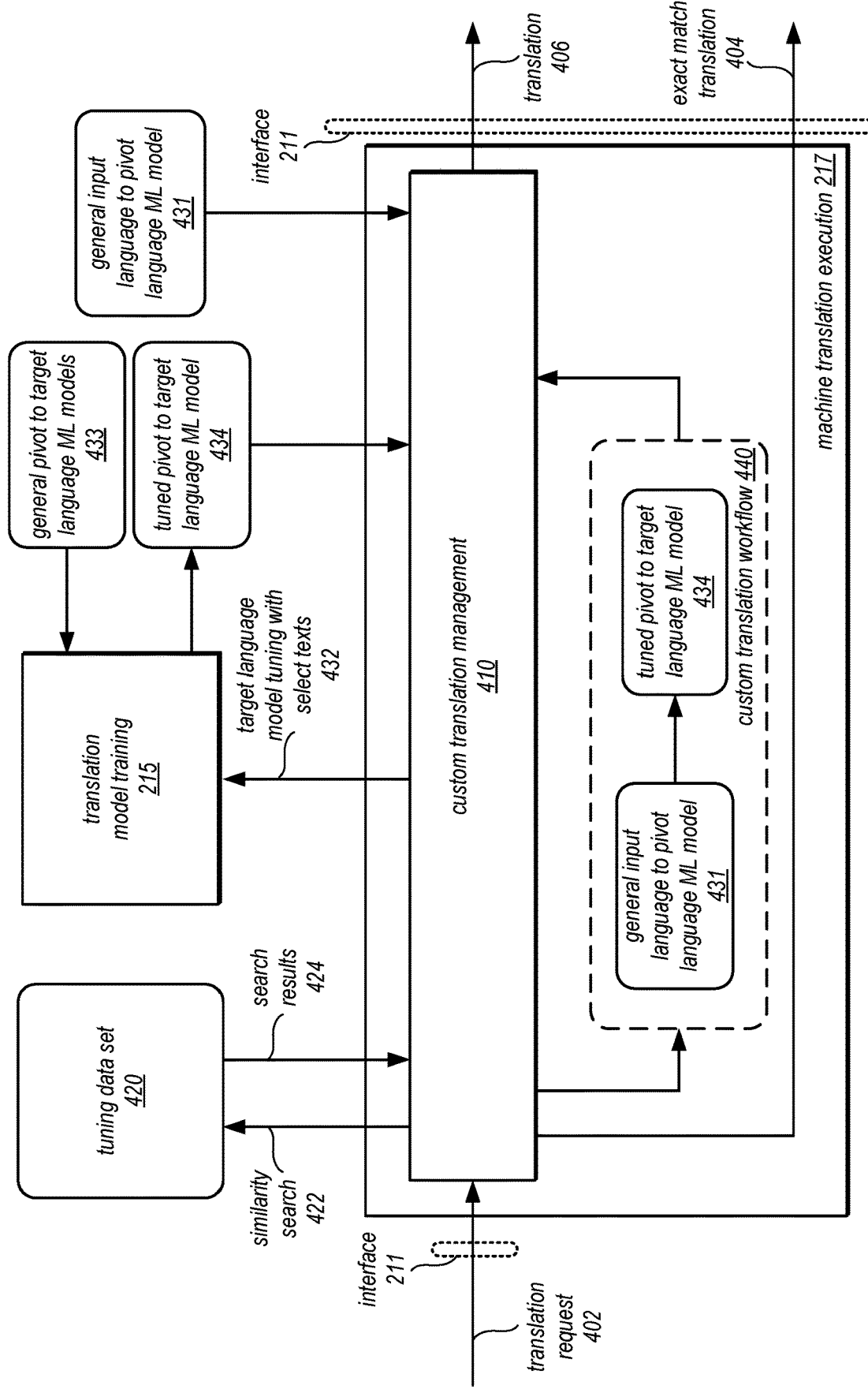
FIG. 4 illustrates a logical block diagram of machine translation execution of a machine translation service that implements custom translation management for selectively tuning machine translation models for custom machine translations, according to some embodiments.

Although FIGS. 2-4 have been described and illustrated in the context of a provider network implementing a machine translation service, the various components illustrated and described in FIGS. 2-4 may be easily applied to other systems that implement machine translation, either stand-alone systems or implemented as a feature of a larger application. As such, FIGS. 2-4 are not intended to be limiting as to other embodiments of ratio mask post-filtering for audio enhancement.

Figure 5:
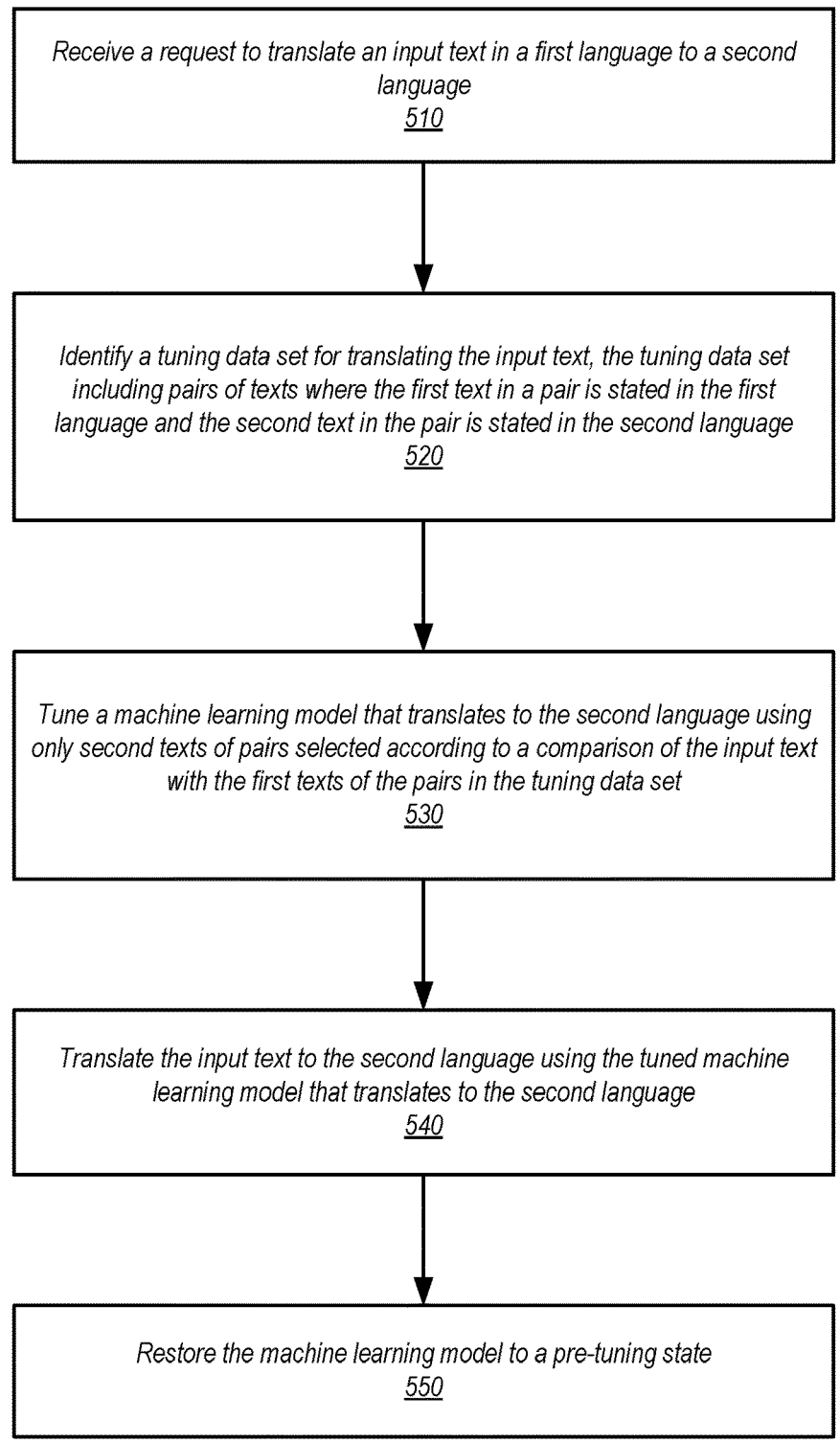
FIG. 5 illustrates a high-level flowchart of various methods and techniques to implement selectively tuning machine translation models for custom machine translations, according to some embodiments.
Figure 6:
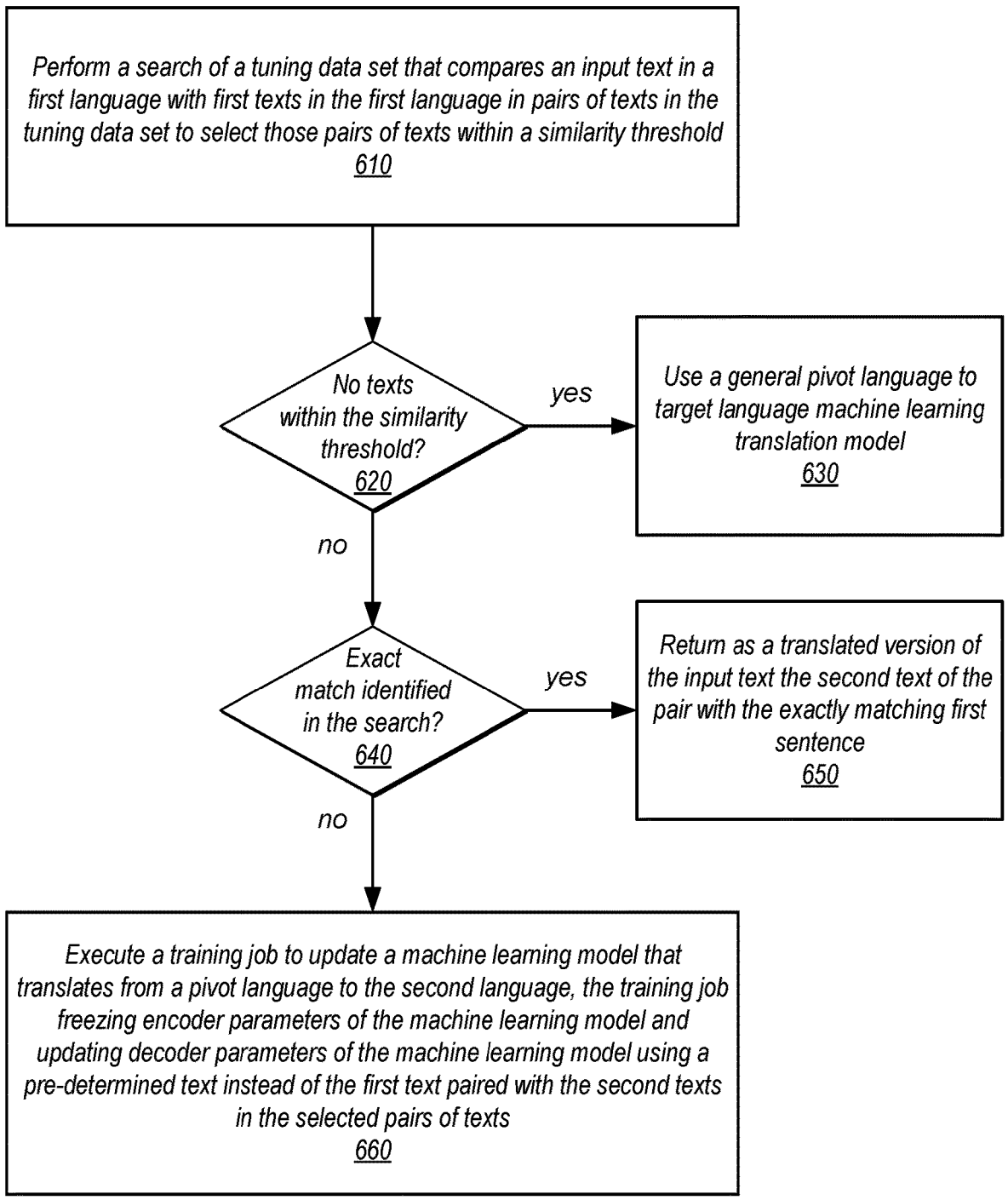
FIG. 6 illustrates a high-level flowchart of various methods and techniques to implement searching tuning data sets to select and execute training jobs to update translation machine learning model, according to some embodiments.

FIG. 5 illustrates a high-level flowchart of various methods and techniques to implement selectively tuning machine translation models for custom machine translations, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 510, a request to translate an input text in a first language to a second language may be received, in various embodiments. The request may be received via various kinds of interfaces implemented by a machine translation system (e.g., command line, programmatic interface, GUI, etc.). The request may include various parameters such as storage location for the input text, which may be part of a batch of text (e.g., multiple texts in a document or larger work, such as a book, article, documentation, etc.) that is to be translated in response to the request. In some embodiments, the request to translate may include the text itself (e.g., as a parameter of the translation request).

As indicated at 520, a tuning data set for translating the input text may be identified, in some embodiments. For example, the tuning data set may be identified from the translation request itself (e.g., by an account, user, or other identifier associated with the request or an identifier for the tuning data set included in the request) or may be identified based on the target language of the translation request (e.g., the second language). The tuning data set, as discussed above with regard to FIG. 1, may include pairs of texts, with the first text of the pair stating the text in a first language (e.g., the same language as the input text) and a second text of the pair stating the same text in the second language. The tuning data set may have many different pairs of texts that can be used to perform translation.

As indicated at 530, a machine learning model that translates to the second language may be tuned using only second texts of pairs selected according to a comparison of the input text with the first texts of the pairs in the tuning data set. The first texts of the selected pairs may not be used to tune the machine learning model. Different techniques for selecting pairs are discussed below with regard to FIG. 6. In some embodiments, the machine learning model that translate to the second language may translate from a pivot language. In some embodiments, the machine learning model may translate directly from an input language.

Different training techniques which update the machine learning model may be used which allow for incremental updating of the machine learning model. In other embodiments, the training techniques may retrain the machine learning model using a general training data set and also use the second texts of the selected text pairs. FIG. 6, discussed below, provides further detailed examples of tuning the machine learning model using only the second texts of pairs.

As indicated at 540, the input text may be translated to the second language using the tuned machine learning model that translates to the second language, in various embodiments. For example, a cascading technique, as discussed above with regard to FIG. 4, that utilizes a first translation model that translates from the input language, the first language, to a pivot language, may be used, which may not be tuned to the tuning data set, in order to generate a translated version of the input text in the pivot language (e.g., another human readable language or a non-human readable encoding of the input text). Then, the tuned model may be trained to translate from the pivot language version of the input text to the second language, in order to generate the translated version of the input text in the second (target) language. Note that in some embodiments, a tuning techniques do not have to utilize a pivot language, thus the tuning data set could be applied to a machine learning model that, for example, translates directly from the first language to the second language (e.g., in scenarios where incremental training of using only the second texts achieves better tuning performance than using both texts of pairs).

As indicated at 550, the machine learning model may be restored to a pre-tuning state, in some embodiments. For example, a different tuning data set could be used for the same target language, which may optimize translation for a different translation context. Thus, a copy of the machine learning model prior to tuning may be preserved, in various embodiments, for different tuning, or use without tuning, and used to replace in a the tuned machine learning model in a translation model store. Restore of the machine learning model may be performed after translating the input text but before the completion of a translation job, in some embodiments.

As noted above, tuning may be performed to update a machine learning model to incorporate specific translation examples from one language to another. FIG. 6 illustrates a high-level flowchart of various methods and techniques to implement searching tuning data sets to select and execute training jobs to update translation machine learning model, according to some embodiments. As indicated at 610, a search of a tuning data set that compares an input text in a first language with first texts in the first language in pairs of texts in the tuning data set may be performed to select those pairs within a similarity threshold, in some embodiments.

Different search techniques may be utilized. For instance, fuzzy text search functions which may allow for a threshold number of edits (e.g., changes) to a search text string, such as the input text, may be performed against the first texts of the tuning data set. Another example search technique may utilize comparison techniques that rely upon mathematical comparison, such as cosine similarity, wherein the input texts and first texts are represented as vectors and then compared for similarity. If the cosine similarity values are within a threshold value, the texts may be considered similar.

In some scenarios, no texts may be identified within a similarity threshold, as indicated by the positive exit from 620. In such scenarios, a general pivot language to target language machine learning translation model may be used as part of translating the input text, as indicated at 630.

As indicated at 640, in some scenarios an exact match of the input text with a tuning data set first text may be found. For instance, a tuning data set may be provided by one entity/user and the input text for translation provided by another entity/user. If the exact match is found, instead of perform machine learning model based translation, the translation of the text identified in the second text of the pair may be returned as the translated version of the input text, as indicated at 650, in various embodiments.

As indicated at 660, a training job may be executed to update the machine learning model that translates from a pivot language to the second language, in various embodiments. In this way, the machine learning model that produces the translated version of the input text is tuned (as opposed to the machine learning model that accepts the original input text being tuned, which would translate the input text into the pivot language). The training job may configure of training tasks to include freezing encoder parameters of the machine learning model, in some embodiments. Also, parameter training may be configured so that instead of using a first text of the selected pair (in the first language) to the second text of the pair in the target language, a pre-determined text is used instead of the first text and paired with the corresponding second text in the selected pair. For example, a pre-determined text may be a default value text, a blank value text, or may be a repeat of the target language text. In various embodiments, training hyperparameters, such as the learning rate and the number of epochs, may be determined according to the similarity of the selected pairs with the input text. Greater similarity with an input text, for instance, may result in a higher learning rate and higher number of epochs than if the selected pairs had less similarity with the input text.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
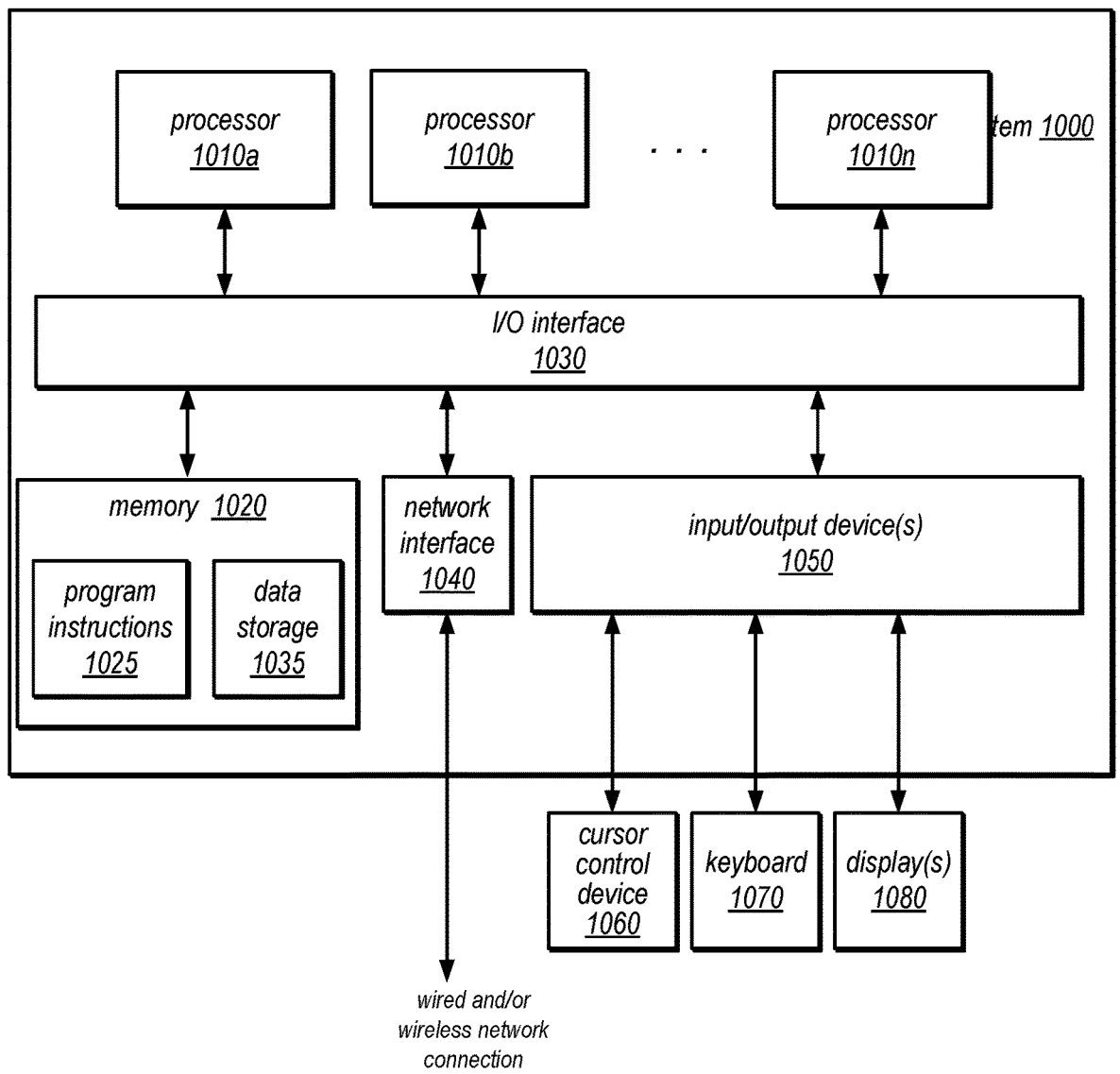
FIG. 7 illustrates an example system to implement the various methods, techniques, and systems described herein, according to some embodiments.

Embodiments of selectively tuning machine translation models for custom machine translations as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques as described herein, including the application of self-supervised training for audio anomaly detection and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to:
   receive a request to translate an input text in a first language to a second language;
   identify a tuning data set for translating the input text, wherein the tuning data set comprises a plurality pairs of texts, wherein first texts in the plurality of pairs of texts are stated in the first language and wherein second texts in the plurality of pairs of texts are stated in the second language;
   compare the input text with the first texts in the plurality of pairs of texts to select one or more of the plurality of pairs of texts to use to update a machine learning model that translates from a pivot language to the second language;
   further train the machine learning model using only second texts of the selected one or more pairs of texts;
   translate the input text to the pivot language using a different machine learning model that translates from the first language to the pivot language; and
   translate the input text in the pivot language to the second language using the further trained machine learning model.

2. The system of claim 1, wherein to further train the machine learning model, the program instructions cause the at least one processor to:
   freeze training of encoder parameters of the machine learning model; and
   use a pre-determined text paired with the second texts of the selected one or more pairs of texts instead of the first texts to update decoder parameters.

3. The system of claim 1, wherein to compare the input text with the first texts in the plurality of pairs of texts to select one or more of the plurality of pairs of texts to use to update the machine learning model, the program instructions cause the at least one processor to:
   generate similarity scores between the input text with the first texts in the plurality of pairs of texts; and
   select the one or more of the plurality of pairs of texts with similarity scores with the input text that are within a similarity threshold.

4. The system of claim 1, wherein the at least one processor and the memory are implemented as part of a machine translation service offered by a provider network and wherein the tuning data set is created at the machine translation service responsive to a request to create the tuning data set received at the machine translation service.

5. A method, comprising:
   receiving, at a machine translation system, a request to translate an input text in a first language to a second language;
   identifying, by the machine translation system, a tuning data set for translating the input text, wherein the tuning data set comprises a plurality pairs of texts, wherein first texts in the plurality of pairs of texts are stated in the first language and wherein second texts in the plurality of pairs of texts are stated in the second language;
   tuning, by the machine translation system, a machine learning model that translates to the second language using only one or more second texts from one or more of the plurality of pairs of texts selected according to a comparison of the input text with first texts of the one or more pairs of texts in the tuning data set; and
   translating, by the machine translation system, the input text to the second language using the tuned machine learning model that translates to the second language.

6. The method of claim 5, wherein tuning the machine learning model that translates to the second language comprises freezing training of encoder parameters of the machine learning model.

7. The method of claim 5, wherein tuning the machine learning model that translates to the second language comprises:
   generating similarity scores between the input text with the first texts in the plurality of pairs of texts; and
   selecting the one or more of the plurality of pairs of texts with similarity scores with the input text that are within a similarity threshold.

8. The method of claim 5, wherein the request to translate the input text in the first language to the second language is a batch translation request that includes the input text as part of a batch of text to translate into the second language.

9. The method of claim 5, wherein the request to translate the input text in the first language to the second language is synchronous translation request that includes the input text as part of the request.

10. The method of claim 5, further comprising:
    translating the input text to generate a version of the input text in a pivot language using a general machine learning translation model that translates from the first language to the pivot language, wherein the version of the input text in the pivot language is translated using the tuned machine learning model that translates to the second language.

11. The method of claim 5, further comprising:
    after the translating of the input text to the second language, restoring the machine learning model to a pre-tuning state.

12. The method of claim 5, further comprising:
receiving a request to translate a second input text from the first language to the second language;
performing a search of the tuning data set that compares the second input text in the first language to the first texts in the first language in the plurality of pairs of texts in the tuning set to identify one of the first texts as an exact match with the second input text; and
returning as a translated version of the second input text, the second text in the pair of texts that is identified as the exact match with the second input test.

13. The method of claim 5, wherein tuning the machine learning model that translates to the second language uses one or more hyperparameters determined according to a similarity of the input text with the first texts of the selected one or more pairs of texts.

14. One or more non-transitory, computer-readable storage media, storing program instructions that when executed on or across one or more computing devices cause the one or more computing devices to implement:
receiving, at a machine translation system, a request to translate an input text in a first language to a second language;
identifying, by the machine translation system, a tuning data set for translating the input text, wherein the tuning data set comprises a plurality pairs of texts, wherein first texts in the plurality of pairs of texts are stated in the first language and wherein second texts in the plurality of pairs of texts are stated in the second language;
tuning, by the machine translation system, a machine learning model that translates from a pivot language to the second language using only one or more second texts from one or more of the plurality of pairs of texts selected according to a comparison of the input text with first texts of the one or more pairs of texts in the tuning data set; and
applying, by the machine translation system, the tuned machine learning model to a version of the input text translated into the pivot language to generate a translated version of the input text in the second language.

15. The one or more non-transitory, computer-readable storage media of claim 14, wherein, in tuning the machine learning model that translates to the second language, the program instructions cause the one or more computing devices to implement
using a pre-determined text paired with the second texts of the selected one or more pairs of texts instead of the first texts to update decoder parameters.

16. The one or more non-transitory, computer-readable storage media of claim 14, wherein, in tuning the machine learning model that translates to the second language, the program instructions cause the one or more computing devices to implement:
generating similarity scores between the input text with the first texts in the plurality of pairs of texts; and
selecting the one or more of the plurality of pairs of texts with similarity scores with the input text that are within a similarity threshold.

17. The one or more non-transitory, computer-readable storage media of claim 14, storing further instructions that when executed by the one or more computing devices, causing the one or more computing devices to implement:
receiving a request to translate a second input text from the first language to the second language;
performing a search of the tuning data set that compares the second input text in the first language to the first texts in the first language in the plurality of pairs of texts in the tuning set that returns no similar pairs of text; and
using a general machine learning model that translates to the second language to translate the second input text.

18. The one or more non-transitory, computer-readable storage media of claim 14, storing further instructions that when executed on or across the one or more computing devices, cause the one or more computing devices to further implement:
translating the input text to generate the version of the input text in the pivot language using a general machine learning translation model that translates from the first language to the pivot language.

19. The one or more non-transitory, computer-readable storage media of claim 14, storing further instructions that when executed on or across the one or more computing devices, cause the one or more computing devices to further implement:
receiving a request to translate a second input text from the first language to the second language;
performing a search of the tuning data set that compares the second input text in the first language to the first texts in the first language in the plurality of pairs of texts in the tuning set to identify one of the first texts as an exact match with the second input text; and
returning as a translated version of the second input text, the second text in the pair of texts that is identified as the exact match with the second input test.

20. The one or more non-transitory, computer-readable storage media of claim 14, wherein the one or more computing devices are implemented as part of a machine translation service offered by a provider network and wherein the tuning data set is created at the machine translation service responsive to a request to create the tuning data set received at the machine translation service.

* * * * *